United States Patent [19]

Muncke et al.

[11] 3,808,949
[45] May 7, 1974

[54] AXIAL PISTON HYDRAULIC MOTOR

[75] Inventors: Ludwig Muncke, Odenwald; Josef Buchmuller; Konrad Stieler, both of Mannheim, all of Germany

[73] Assignee: Deere & Company, Moline, Ill.

[22] Filed: June 30, 1971

[21] Appl. No.: 158,261

[52] U.S. Cl.................. 91/473, 60/436, 417/223
[51] Int. Cl.................. F04b 49/00, F04b 3/00
[58] Field of Search ............ 91/473, 482, 499, 504, 91/505; 417/223, 319, 273; 180/66; 188/295, 290; 192/3 R, 59; 60/436

[56] References Cited
UNITED STATES PATENTS

| | | | |
|---|---|---|---|
| 3,638,772 | 2/1972 | Ninomiya | 60/436 |
| 3,439,766 | 4/1969 | Dence et al. | 91/499 |
| 3,468,263 | 9/1969 | Niemiec | 91/499 |
| 2,577,285 | 12/1951 | Stephan | 417/273 |
| 3,266,715 | 8/1966 | Hass et al. | 417/223 |
| 3,488,980 | 1/1970 | Burrough | 192/59 |
| 3,043,412 | 7/1962 | Bartholomaüs | 192/3 R |

FOREIGN PATENTS OR APPLICATIONS

| | | | |
|---|---|---|---|
| 53,369 | 5/1967 | Poland | 91/491 |

*Primary Examiner*—William L. Freeh
*Assistant Examiner*—Gregory Paul La Pointe

[57] ABSTRACT

An axial piston hydraulic motor has a housing, a shaft journaled in the housing, and a cylinder barrel with a plurality of axially extending cylinders and pistons connected to the drive shaft. The outer end of each piston rides on a swash plate, which is shiftable to a limited degree in an axial direction between a condition, wherein it is freely rotatable relative to the housing so that it rotates with the cylinder barrel, and a locked condition, wherein it is locked to the housing, so that the cylinder barrel rotates when the pistons reciprocate. The swash plate is automatically shifted to its locked condition in response to the fluid pressure supplied to the cylinders.

9 Claims, 3 Drawing Figures

3,808,949

AXIAL PISTON HYDRAULIC MOTOR

BACKGROUND OF THE INVENTION

This invention relates to a hydraulic fluid translating device, and more particularly to an axial piston hydraulic motor having particular utility in an auxiliary hydrostatic propulsion drive for agricultural vehicles, or the like.

It is known to provide auxiliary hydrostatic propulsion drives for agricultural vehicles, such as combines or tractors, to provide a four-wheel drive for the vehicle when necessary, such as when the vehicle encounters poor traction conditions. Such systems typically include an engine-driven hydraulic pump, which supplies fluid under pressure to hydraulic motors mounted in the auxiliary drive wheels through a control valve, which is conventionally selectively actuated to supply fluid pressure to the wheel motors in either direction for forward or reverse operation of the motors or to disconnect the motors from the pressure source. In a tractor, the auxiliary drive wheels are conventionally the front wheels, while in a combine, the main drive wheels are at the front of the machine and the auxiliary drive wheels are the steerable rear wheels.

Most auxiliary drive wheel motors are of the axial piston type, which rotate at a relatively high speed, so that a gear reduction is necessary between the motors and the drive wheels. Since the maximum rotational speed of such motors is limited, the auxiliary drive is normally used only during lower vehicle speeds. To prevent the motor from being driven by the wheel and acting as a pump when the fluid pressure source is disconncted from the motor or when the vehicle speed exceeds the capacity of the pump, it has been found desirable to provide a clutch between the wheel and the motor. Heretofore, such clutches have been disposed in the drive train between the motor and the wheel and have been operative to disconnect the motor from the wheel whenever the control valve is shifted to disconnect the fluid pressure source from the motor.

SUMMARY OF THE INVENTION

According to the present invention, an improved axial piston hydraulic motor is provided for an auxiliary hydrostatic drive. More specifically, clutch means are provided within the hydraulic motor itself for automatically engaging the front wheel drive only when fluid under pressure is supplied to the motor, so that the motor is automatically disconnected from the wheel when the auxiliary wheel drive is disengaged.

An important feature of the invention resides in the elimination of the usual clutch in the gear train between the wheel and the motor to accomplish the above function.

Another feature of the invention resides in the provision of an axially shiftable swash plate, which is automatically locked to the motor housing only when fluid under pressure is supplied to the motor, the locked swash plate causing rotation of the cylinder barrel in the motor in response to reciprocation of the motor pistons, while the disconnection of the motor from the pressure source automatically causes the swash plate to become unlocked from the housing so that it is free to rotate with the cylinder barrel of the motor to eliminate reciprocation of the pistons when the motor is not operating.

Still another important feature of the invention resides in the novel means for locking the swash plate to the motor housing in response to pressurization of the motor.

DESCRIPTION OF THE PREFERRED EMBODIMENTS

Figure 3:
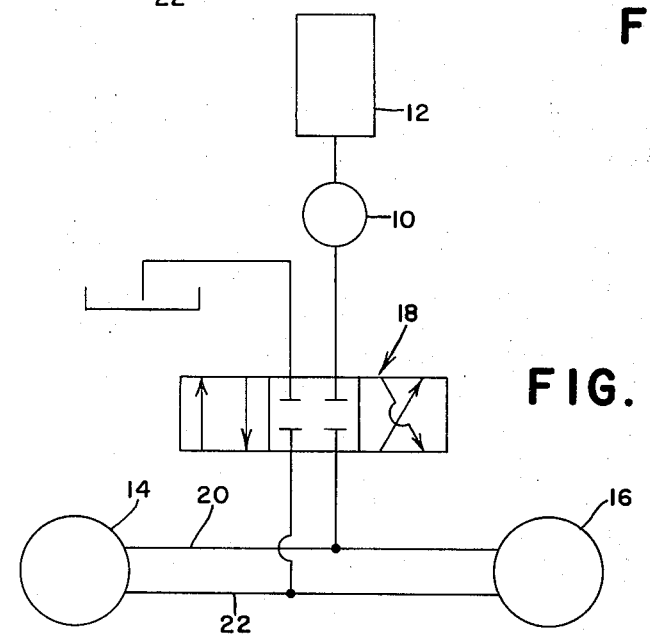
FIG. 3 is a schematic illustration of a hydrostatic wheel drive system in a neutral condition and incorporating the novel wheel motors.

A hydrostatic front wheel drive system is schematically illustrated in FIG. 3 and includes a hydraulic pump 10 driven by an engine 12 and connected to a pair of wheel motors 14 and 16 through a valve 18, which is shown in its neutral condition wherein it disconnects the pump from the wheel motor. As is apparent, the motors 14 and 16 are connected in parallel by inlet and outlet lines 20 and 22, respectively, and the valve 18 is shiftable in one direction to connect the inlet line 20 to the pressure source and the outlet line to the reservoir for forward operation of the vehicle, and in the opposite direction to connect the outlet line 22 to the pump 10 and the inlet line 20 to the reservoir for reverse operation of the motors. An auxiliary hydrostatic front wheel drive system is shown in greater detail in U.S. Pat. No. 3,458,005, assigned to the assignee herein.

Figure 1:
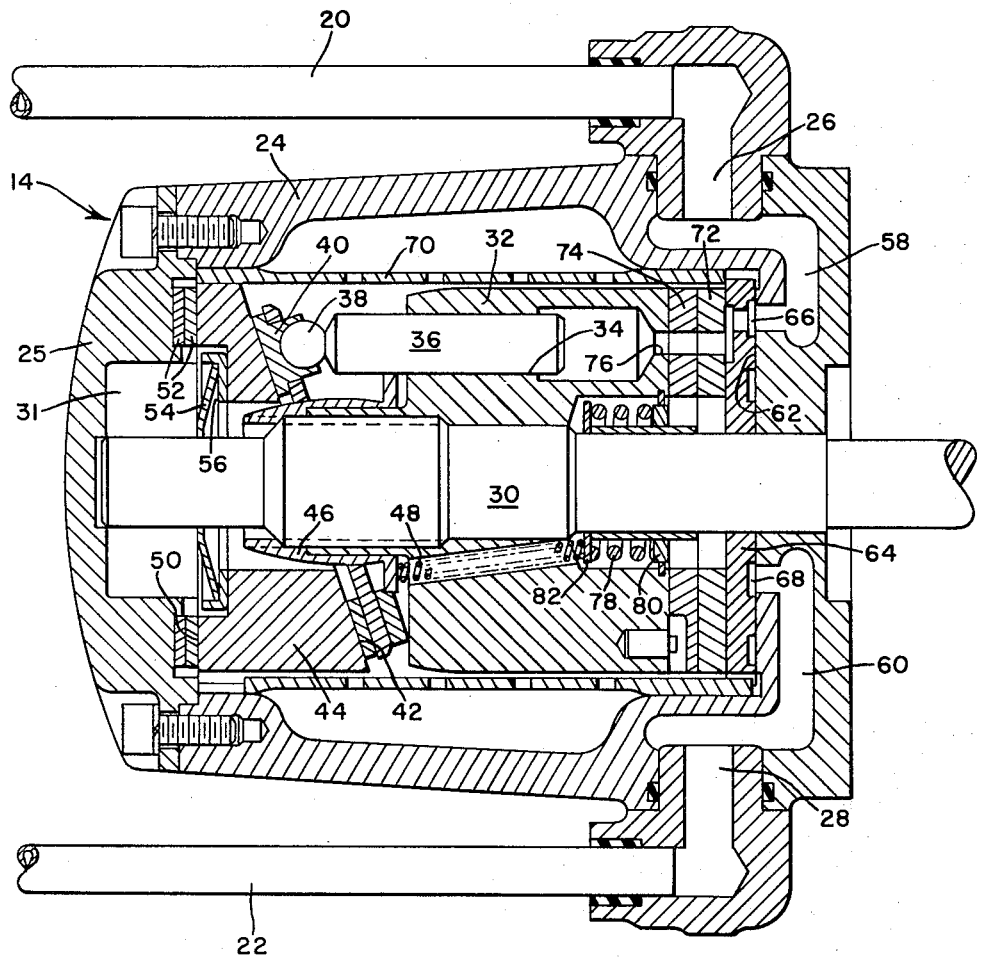
FIG. 1 is an axial section through an hydraulic motor embodying the invention.

The motor 14 is shown in detail in FIG. 1 and includes a closed housing 24 having a generally cylindrical interior chamber. The housing 24 is closed by an end plate 25 and includes an inlet port 26 connected to the line 20 and an outlet port 28 connected to the line 22. An axial shaft 30 spans the housing interior and has one end journaled in a bearing 31 in the end plate 25, while the other end of the shaft extends through and is journaled in the opposite end wall of the housing.

An annular cylinder barrel 32 is coaxially splined to the shaft 30 within the housing and has a plurality of axially extending cylinders 34 parallel to the shaft axis and offset therefrom at equiangular intervals. A piston 36 is mounted in each cylinder 34 for reciprocation therein, and the outer end of each piston 36 is provided with a ball joint 38, which is received in a corresponding socket in an annular shoe 40. The shoe 40 engages and is rotatable relative to an inclined cam surface 42 on an annular swash plate 44 coaxially rotatable relative to the shaft and disposed adjacent to the end plate 25 of the housing. The shoe 40 is guided on a spherical outer surface on a sleeve 46, which is also splined to the shaft 30 and is biased toward the swash plate 44 by a plurality of springs 48. All of the above represents more-or-less well-known construction for an axial piston hydraulic motor.

The swash plate 44 has an annular end face 50 normal to the axis of the motor and engageable with a pair of annular friction or brake discs 52 disposed in an annular recess in the end plate 25 of the housing. Thus, when the swash plate 44 is pressed against the brake discs 52, the swash plate is locked to the housing. A Belleville type spring 54 acts between the bearing 31 and an annular thrust plate 56 disposed in a recess in the end face 50 of the swash plate to bias the swash plate away from the brake disc 52 and out of engagement with the housing.

The inlet and outlet ports 26 and 28 respectively communicate with inlet and outlet passages 58 and 60 in the end wall of the housing, which has a radial face 62 onto which the passages 58 and 60 open. An annular manifold plate 64 is coaxially mounted on the shaft adjacent the housing face 62 and has an outer annular passage 66 communicating with the passage 58 and an inner annular passage 68 communicating with the passage 60. The manifold plate 64 is connected to the swash plate 44 by a cylindrical sleeve 70 which extends the length of the housing interior and surrounds the cylinder barrel 32 and swash plate 44. The sleeve 70 is keyed to both the manifold plate 64 and swash plate 44, so that when the swash plate rotates the manifold plate 64 also rotates.

An annular valve plate 72 is coaxially disposed adjacent the inner face of the manifold plate 64, and a similar annular plate 74 is disposed between the inner face of the valve plate 72 and the radial face of the cylinder barrel 32. The valve plate 72 is provided with the usual kidney-shaped passages, which communicate with passages in the plate 74, which in turn communicate with axially extending passages 76 in the cylinder barrel 32. The valve plate 72 rotates relative to the manifold plate 64 to sequentially connect the cylinders 34 to the inlet and outlet passages via the passages 66 and 68, the passages through the plate 72 and 74, and the passages 76 in a well-known manner.

A helical compression spring 78 is coaxially disposed on the shaft 30 and acts between a disc 80, connected to the cylinder barrel 32, and a disc 82 engaged by the springs 48 to bias the cylinder barrel 32 toward the valve plate 72 and the manifold plate 64.

In operation, when the control valve 18 is in its neutral position as shown, the cylnders 34 are unpressurized, so that th pistons 36 do not exert an axial force on the swash plate 44. The spring 54 operates to shift the swash plate away from the brake disc 53, so that the swash plate 44 is freely rotatable relative to the housing 24. Thus, when the shaft 30, which is connected to the vehicle wheel, is rotated through normal motion of the vehicle, the cylinder barrel 32 rotates therewith, and since the swash plate 44 is also free to rotate, it rotates with the cylinder barrel 32. Since the manifold plate 64 is locked to the swash plate 44 by the sleeve 70, it also rotates with the cylinder barrel, as well as the plates 72 and 74 between the manifold plate and the cylinder barrel, so that the entire motor, except the housing, rotates as a unit with the shaft 30.

When the valve 18 is shifted for forward operation of the wheel motors 14 and 16, the inlet line 20 is pressurized and the outlet line 22 is connected to the resevoir. The pressure in the inlet line 20 is transmitted to some of the cylinders 34 via the inlet port 26, the passage 58, the passage 66, the passages through the plates 64, 72, and 74, and the passage 76, while the remaining cylinders are similarly connected to the outlet line. The pressure in the pressurized cylinders 34 exerts a force on the pistons, which generate an axial force on the swash plate 44 tending to shift the swash plate toward the end plate 25. When the pressure is high enough that the force generated by the pistons on the swash plate exceeds the force in the opposite direction generated by the spring 54, the swash plate 44 will shift toward the housng end plate 25, thereby compressing the brake discs 52 to lock the swash plate 44 to the housing. Once the swash plate is locked, the reciprocation of the pistons 36 will rotate the cylinder barrel 32 and consequently the shaft 30 in the usual manner. Thus, the motor is automatically placed in an operative condition only when pressurized fluid is supplied to the motor. As is apparent, the motor can be reversed by shifting the valve 18 in the opposite direction to direct the fluid pressure to the line 22, while connecting the line 20 to the reservoir, as is well known. As is also apparent, if the speed of the vehicle and consequently the speed of the shaft exceeds the capacity of the pump, such as when the vehicle is moving at a higher rate of speed, so that the wheel motor acts as a pump, the loss of pressure supplied to the pistons will permit the spring 54 to shift the swash plate 44 to its unlocked condition, to thereby disengage the motor.

Figure 2:
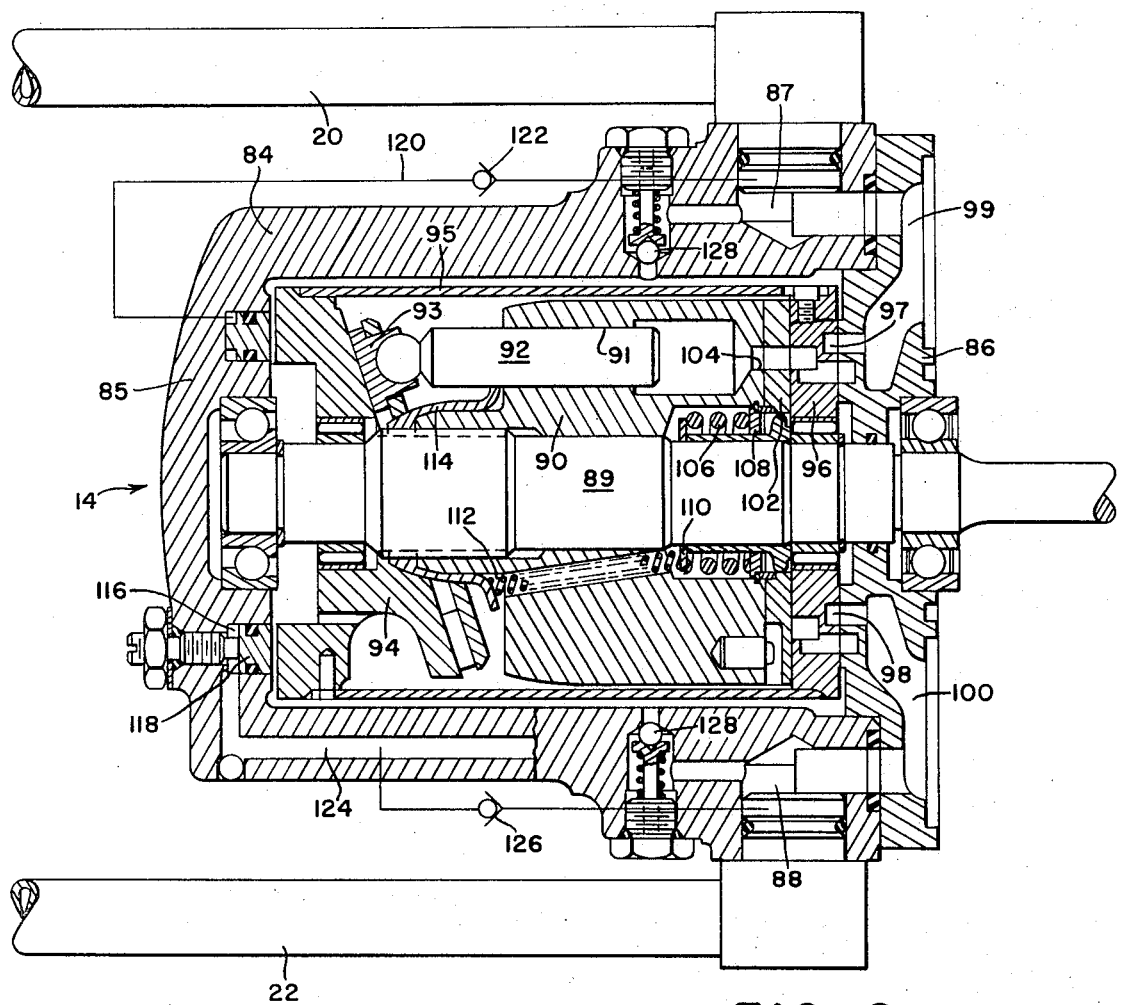
FIG. 2 is an axial section of a second embodiment of the invention.

A slightly different embodiment of the wheel motor 14 is shown in FIG. 2. The motor again includes a closed housing 84 having an end wall 85 at one end and closed by an end plate 86 at its opposite end. The motor again has inlet and outlet ports 87 and 88, respectively connected to the inlet and outlet lines 20 and 22, and an axial shaft 89 having its inner end journaled in the end wall 85 and its outer end journaled in and extending through the end plate 86. A cylinder barrel 90 is splined to the shaft 89 and includes a plurality of axially extending cylinders 91 parallel to the shaft 89 and having pistons 92 mounted for reciprocation therein. The outer ends of the pistons 92 are connected to a piston shoe 93 in a conventional manner, and the shoe rides on the inclined cam surface of a swash plate 94 coaxially journaled on the shaft 89. The swash plate 94 is connected to one end of a cylindrical sleeve 95, the opposite end of which is connected to an annular manifold plate 96 coaxially journaled on the shaft 89 adjacent the radial face of the end plate 86. The manifold plate has an outer annular passage 97 and an inner annular passage 98 respectively connected to an inlet passage 99 in the end plate 86 and in communication with the inlet port 87 and an outlet passage 100 in the end plate 86 in communication with the outlet port 88.

An annular valve plate 102 is disposed between the manifold plate 96 and the end of the cylinder barrel 90 and has the usual passages for connecting the manifold plate passages to the cylinders 91 via passages 104 in the cylinder barrel, the valve plate 102 rotating relative to the manifold plate 96 to connect some of the cylinders 91 to the inlet passage 99 and the other cylinders to the outlet passage 100 to cause the pistons 92 to reciprocate.

A helical coiled spring 106 is coaxially disposed on the shaft 89 and operates between a disc 108 connected to the cylinder barrel 90 and a disc 110, which in turn engages a plurality of springs 112, the opposite ends of which engage a guide sleeve 114 having a spherical outer surface on which the shoe 93 rides. As is apparent, the spring 106 urges the cylinder barrel and the valve plate 102 against the manifold plate 96.

The end wall 85 has an annular recess 116 opposite the end face of the swash plate 94 and an annular piston 118 is mounted in the recess 116 and is engageable with the end face of the swash plate 94 when fluid under pressure is supplied to the recess. The recess is connected to the inlet port 87 by a hydraulic line 120 having a check valve 122 permitting the flow of fluid only from the inlet port to the recess. Both the line and the check valve are schematically illustrated. The recess is similarly connected to the outlet port 88 by a hydraulic line 124 having a check valve 126 which permits flow of fluid only from the port 88 to the recess. Thus, the recess is pressurized when fluid pressure is applied to either the inlet line 20 or the outlet line 22. A pair of drain check valves 128 are interposed between the housing interior and the inlet and outlet ports to permit the exhaust of leakage fluid from the housing to the low pressure side of the motor.

In operation, like the previous embodiment, when the system is in neutral and no pressure is supplied to the wheel motors, the swash plate 94 is free to rotate on a shaft 89, and since the swash plate is connected to the manifold plate 96 by the sleeve 95, the entire motor except for the housing rotates with the shaft 89 and the cylinder barrel 90. When pressure is supplied to the inlet port 87 via the inlet line 90, the annular recess 116 is pressurized causing the piston 118 to shift to the right to engage the end of the swash plate 94, thereby forcing the swash plate, the sleeve 95, and the manifold plate 96 to the right against the end plate 86 of the housing to lock the swash plate to the housing. With the swash plate locked, the reciprocation of the pistons 92, caused by the alternate connection of the cylinders 91 to the inlet and outlet passages 99 and 100, causes the cylinder barrel 90 and consequently the shaft 89 to rotate. If the pressure is supplied to the line 22 for reverse operation of the motor, the same result is achieved, except that the recess 116 is pressurized through the line 124 rather than the line 120. Thus, as in the previous embodiment, the motor is placed in its operative condition only when fluid under pressure is supplied thereto, and is otherwise free to rotate as a unit with the shaft.

We claim:

1. An axial piston hydraulic motor comprising: a housing having an inlet and an outlet; a shaft journaled in said housing; a cylinder barrel within said housing drivingly connected to said drive shaft and having a plurality of axially extending cylinders; a plurality of pistons having their ends respectively mounted for reciprocation in the cylinders and having cam engaging means on their opposite ends; and inclined swash plate disposed within the housing coaxial with the cylinder barrel for engagement by the cam engaging means and shiftable to a limited degree between a first condition, wherein it is freely rotatable relative to the housing and therefore rotatable with the cylinder barrel, and a second condition, wherein it is locked to the housing to cause rotation of the cylinder barrel in response to reciprocation of the pistons; a source of fluid pressure connected to the linet; control means for supplying fluid pressure from the inlet to the cylinders to reciprocate the pistons, the control means including a valve manifold and a radial valve plate disposed at the opposite end of the cylinder barrel from the swash plate and adjacent to the valve manifold, and means connecting the valve manifold with the swash plate for rotation therewith, the valve manifold being rotationally fixed when the swash plate is in its second condition; and hydraulic means including at least one hydraulic actuator operatively connected to the swash plate and responsive to fluid pressure supplied to the cylinders for automatically shifting the swash plate into its second condition when the fluid pressure is supplied to the cylinders and conduit means for connecting the hydraulic actuator to the inlet.

2. The invention defined in claim 1 wherein the means connecting the valve manifold to the swash plate includes an annular sleeve extending around the barrel between the valve manifold and the swash plate, the hdyraulic actuator compressing the stacked swash plate, sleeve, and valve manifold against the housing to lock the swash plate, sleeve, and valve manifold against rotation.

3. The invention defined in claim 1 wherein the hydraulic actuator comprises an annular cylinder and piston disposed in the housing coaxially adjacent to the swash plate.

4. An axial piston hydraulic motor comprising: a housing having an inlet and an outlet; a shaft journaled in said housing; a cylinder barrel within said housing drivingly connected to said drive shaft and having a plurality of axially extending cylinders; a plurality of pistons having their ends respectively mounted for reciprocation in the cylinders and having cam engaging means on their opposite ends; an inclined swash plate disposed within the housing coaxial with the cylinder barrel for engagement by the cam engaging means and shiftable to a limited degree between a first condition, wherein it is freely rotatable relative to the housing and therefore rotatable with the cylinder barrel, and a second condition, wherein it is locked to the housing to cause rotation of the cylinder barrel in response to reciprocation of the pistons, a source of fluid pressure connected to the inlet; control means for supplying fluid pressure from the inlet to the cylinders to reciprocate the pistons; hydraulic means responsive to fluid pressure supplied to the cylinders for automatically shifting the swash plate into its second condition when fluid pressure is supplied to the cylinders; a spring means operatively connected to the swash plate for biasing it toward its first condition; and friction means engaged by the swash plate in its second condition and operative between the swash plate and the housing to lock the swash plate to the housing in said second condition.

5. The invention defined in claim 4 wherein the friction means includes at least one brake disc disposed between the swash plate and the housing coaxial with the swash plate.

6. the invention defined in claim 5 wherein the hydraulic means comprises said axially extending cylinders and pistons, the pistons exerting a force on the swash plate opposite the force exerted by the spring means to force the swash plate against said brake disc when the force exerted by the pistons exceeds the force exerted by the spring means.

7. An axial piston hydraulic unit comprising: a housing having an inlet and an outlet; a shaft journaled in said housing; a cylinder barrel within said housing, drivingly connected to said drive shaft and having a plurality of axially extending cylinders; a plurality of pistons having their inner ends respectively mounted for reciprocation in the cylinders and having bearing means on their outer ends; an inclined swash plate disposed within the housing coaxial with the cylinder barrel and engageable with the piston bearing means; hydraulic means for releasably locking the swash plate to the housing, whereby reciprocation of the pistons when the swash plate is in a locked condition causes rotation of the cylinder barrel while rotation of the cylinder barrel when the swash plate is in its released condition will permit rotation of the swash plate with the cylinder barrel to eliminate the reciprocation of the pistons; means for automatically actuating the locking means to lock the swash plate in response to the supplying of fluid pressure to said pistons; and control means for supplying fluid pressure from the inlet to the cylinders, said control means including a valve manifold having a radial face with inlet and outlet passages respectively connected to the inlet and outlet and a radial valve plate coaxially disposed between the cylinder barrel and the manifold face and having a plurality of axially extending passages for connecting some of the cylinders to the inlet passage and other cylinders to the outlet passage, the valve manifold being rigidly connected to the swash plate for rotation therewith.

8. The invention defined in claim 7 wherein the locking means includes at least one brake disc coaxially disposed between the swash plate and the housing, the force exerted by the pistons on the swash plate compressing the brake disc between the housing and the swash plate to lock the swash plate to the housing.

9. An axial piston hydraulic unit comprising: a housing having an inlet and an outlet; a shaft journaled in said housing; a cylinder barrel within said housing drivingly connected to said shaft and having a plurality of axially extending cylinders; a plurality of pistons having their ends respectively mounted for reciprocation in the cylinders and having cam engaging means on their opposite ends; and inclined swash plate disposed within the housing coaxial with the cylinder barrel for engagement by the cam engaging means and shiftable to a limited degree betwen a first condition, wherein it is freely rotatable relative to the housing and therefore rotatable with the cylinder barrel, and a second condition, where it is locked to the housing to cause rotation of the cylinder barrel in response to reciprocation of the pistons; a source of fluid pressure connected to the inlet; control means for supplying fluid pressure from the inlet to the cylinders to reciprocate the pistons and including a valve manifold and a radial valve plate disposed at the opposite end of the cylinder barrel from the swash plate; means connecting the valve manifold with the swash plate for rotation therewith, the valve manifold being rotationally fixed when the swash plate is in its second condition; and hydraulic means responsive to fluid pressure supplied to the cylinder for shifting the swash plate from its first condition to its second condition.

* * * * *